US011993256B2

(12) United States Patent
Singh et al.

(10) Patent No.: US 11,993,256 B2
(45) Date of Patent: May 28, 2024

(54) DYNAMIC PERCEPTION ZONE ESTIMATION

(71) Applicant: CNH Industrial America LLC, New Holland, PA (US)

(72) Inventors: Aditya Singh, Bolingbrook, IL (US); Brett McClelland, Chicago, IL (US)

(73) Assignee: CNH Industrial America LLC, New Holland, PA (US)

( * ) Notice: Subject to any disclaimer, the term of this patent is extended or adjusted under 35 U.S.C. 154(b) by 129 days.

(21) Appl. No.: 17/124,140

(22) Filed: Dec. 16, 2020

(65) Prior Publication Data

US 2021/0362705 A1    Nov. 25, 2021

Related U.S. Application Data

(63) Continuation-in-part of application No. 16/882,115, filed on May 22, 2020.

(51) Int. Cl.
    *G08G 1/16* (2006.01)
    *A01B 79/00* (2006.01)
    (Continued)

(52) U.S. Cl.
    CPC ........... *B60W 30/09* (2013.01); *A01B 79/005* (2013.01); *E02F 9/261* (2013.01); *G08G 1/16* (2013.01);
    (Continued)

(58) Field of Classification Search
    CPC ............. B60W 30/09; B60W 2300/15; B60W 2300/17; B60W 2520/18; B60W 2530/10;
    (Continued)

(56) References Cited

U.S. PATENT DOCUMENTS

| 7,079,943 B2 | 7/2006 | Flann et al. |
| 7,193,559 B2 | 3/2007 | Ford et al. |

(Continued)

FOREIGN PATENT DOCUMENTS

| CN | 106909144 A | 6/2017 |
| CN | 107817798 A | 3/2018 |

(Continued)

OTHER PUBLICATIONS

Jiang, et al, "A New Adaptive H-Infinity Filtering Algorithm for the GPS/INS Integrated Navigation", Sensors, Dec. 19, 2019, pp. 1-16, vol. 16.

(Continued)

*Primary Examiner* — Bao Long T Nguyen
(74) *Attorney, Agent, or Firm* — Rickard DeMille; Rebecca Henkel; Peter Zacharias

(57) ABSTRACT

A vehicle control system for an off-road vehicle including a processing circuit including a processor and memory, the memory having instructions stored thereon that, when executed by the processor, cause the processing circuit to receive a first parameter associated with a characteristic of the off-road vehicle, receive a second parameter associated with a characteristic of an environment of the off-road vehicle, generate, based on the first and second parameters, a perception zone for the off-road vehicle, control the off-road vehicle to avoid an obstacle using the perception zone, receive an indication of a change in at least one of the first parameter or the second parameter, and update the perception zone based on the change in the at least one of the first parameter or the second parameter.

20 Claims, 7 Drawing Sheets

(51) Int. Cl.
*B60W 30/09* (2012.01)
*E02F 9/26* (2006.01)

(52) U.S. Cl.
CPC ..... *B60W 2300/15* (2013.01); *B60W 2300/17* (2013.01); *B60W 2520/18* (2013.01); *B60W 2530/10* (2013.01); *B60W 2552/00* (2020.02); *B60W 2555/20* (2020.02); *B60W 2720/10* (2013.01); *B60W 2720/12* (2013.01); *B60W 2720/24* (2013.01)

(58) Field of Classification Search
CPC ......... B60W 2552/00; B60W 2555/20; B60W 2720/10; B60W 2720/12; B60W 2720/24; B60W 2520/14; B60W 2530/20; B60W 2530/203; B60W 2520/16; B60W 2552/15; B60W 2554/20; B60W 2556/10; B60W 30/08; B60W 30/095–0956; B60W 40/02; B60W 40/06; B60W 40/12; B60W 2300/185; A01B 79/005; A01B 69/001; A01B 69/008; E02F 9/261; E02F 9/262; E02F 9/265; G08G 1/16; G05D 1/0088; G05D 1/0214; G05D 1/0055
See application file for complete search history.

(56) References Cited

U.S. PATENT DOCUMENTS

| | | | |
|---|---|---|---|
| 7,454,290 B2 | 11/2008 | Alban et al. | |
| 9,340,211 B1 | 5/2016 | Singh | |
| 9,625,911 B2 | 4/2017 | Lee | |
| 9,711,050 B2 | 7/2017 | Ansari | |
| 10,011,284 B2 | 7/2018 | Berntorp et al. | |
| 10,247,816 B1 | 4/2019 | Hoffmann et al. | |
| 10,338,223 B1 | 7/2019 | Englard et al. | |
| 10,360,476 B2 | 7/2019 | Steinhardt et al. | |
| 10,409,280 B2 | 9/2019 | Zhu | |
| 10,438,493 B2 | 10/2019 | Bavar et al. | |
| 10,442,439 B1 | 10/2019 | Seo et al. | |
| 2007/0255498 A1* | 11/2007 | McDaniel | G01S 13/931 340/436 |
| 2010/0063651 A1* | 3/2010 | Anderson | G05D 1/0088 701/1 |
| 2013/0103249 A1 | 4/2013 | Pieper et al. | |
| 2013/0218396 A1* | 8/2013 | Moshchuk | B60W 50/08 701/25 |
| 2014/0277926 A1 | 9/2014 | Singh et al. | |
| 2017/0118915 A1 | 5/2017 | Middelberg et al. | |
| 2017/0145663 A1* | 5/2017 | Hiranaka | G08B 5/36 |
| 2017/0276534 A1 | 9/2017 | Vermue et al. | |
| 2017/0315549 A1* | 11/2017 | Oppolzer | B60W 30/095 |
| 2017/0351261 A1 | 12/2017 | Levinson et al. | |
| 2017/0357267 A1 | 12/2017 | Foster et al. | |
| 2018/0245922 A1 | 8/2018 | Zaphir et al. | |
| 2018/0276832 A1 | 9/2018 | Aikin | |
| 2019/0146511 A1 | 5/2019 | Hurd et al. | |
| 2019/0239502 A1 | 8/2019 | Palomares et al. | |
| 2019/0315343 A1 | 10/2019 | Steffey et al. | |
| 2019/0325546 A1 | 10/2019 | Hagestad et al. | |
| 2020/0117211 A1 | 4/2020 | Paglieroni et al. | |

FOREIGN PATENT DOCUMENTS

| | | |
|---|---|---|
| CN | 109471432 A | 3/2019 |
| CN | 109828589 A | 5/2019 |
| CN | 109901593 A | 6/2019 |
| EP | 3 318 422 A1 | 5/2018 |
| WO | WO-2017/079460 | 5/2017 |

OTHER PUBLICATIONS

John Leonard et al. "A Perception-Driven Autonomous Urban Vehicle" Jan. 1, 2008.

Joseph Satoru Putney "Reactive Navigation of an Autonomous Ground Vehicle Using Dynamic Expanding Zone" May 11, 2006.

Kok, et al, "Using Inertial Sensors for Position and Orientation Estimation", Foundations and Trends in Signal Processing, 2017, pp. 1-89, vol. 11, No. 1-2.

* cited by examiner

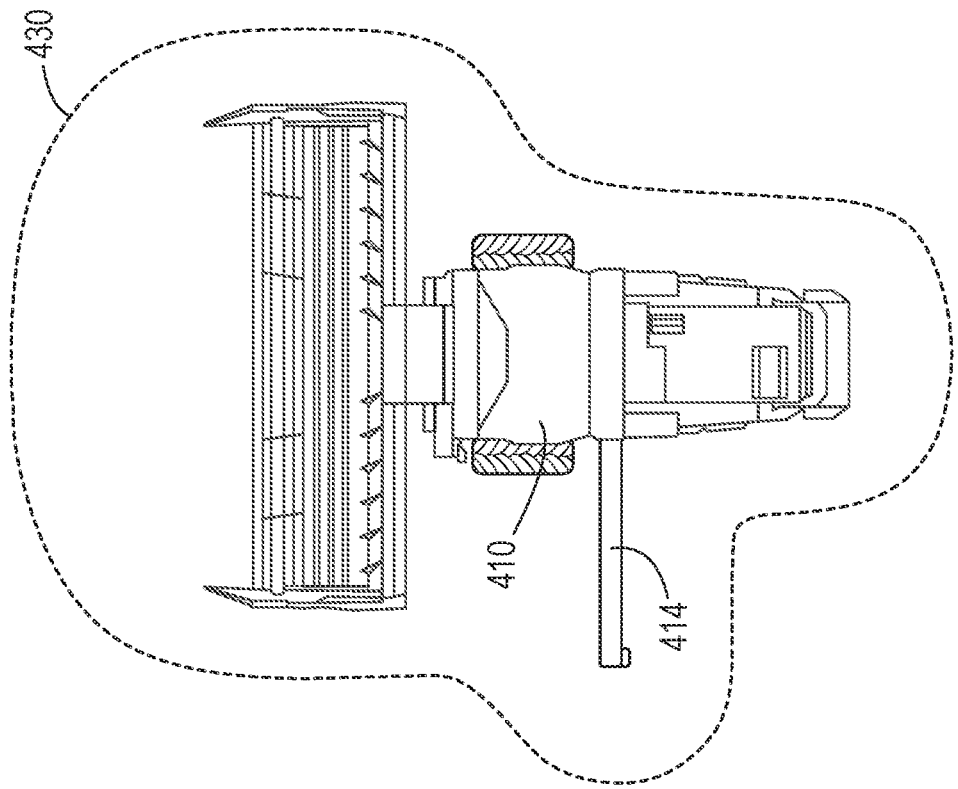
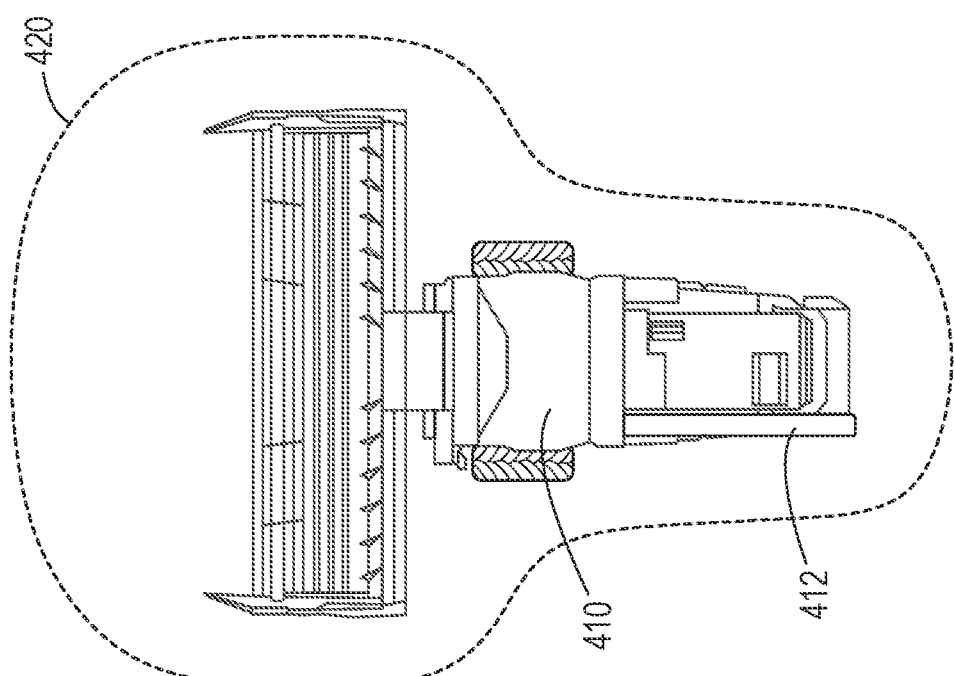
FIG. 4B
FIG. 4A

DYNAMIC PERCEPTION ZONE ESTIMATION

CROSS-REFERENCE TO RELATED APPLICATIONS

This application is a continuation-in-part of U.S. patent application Ser. No. 16/882,115, filed on May 22, 2020, the entire disclosure of which is incorporated by reference herein.

BACKGROUND

The present disclosure relates generally to the field of vehicle path planning, and more particularly to a system and method for determining perception zones and performing obstacle avoidance.

SUMMARY

One embodiment of the present disclosure relates to a vehicle control system for an off-road vehicle including a processing circuit including a processor and memory, the memory having instructions stored thereon that, when executed by the processor, cause the processing circuit to receive a first parameter associated with a characteristic of the off-road vehicle, receive a second parameter associated with a characteristic of an environment of the off-road vehicle, generate, based on the first and second parameters, a perception zone for the off-road vehicle, control the off-road vehicle to avoid an obstacle using the perception zone, receive an indication of a change in at least one of the first parameter or the second parameter, and update the perception zone based on the change in the at least one of the first parameter or the second parameter.

In some embodiments, the first parameter is associated with a mass of the off-road vehicle. In some embodiments, the first parameter is associated with a component health of a component in the off-road vehicle. In some embodiments, the second parameter is associated with a characteristic of ground the off-road vehicle is operating on. In some embodiments, the second parameter includes a cornering stiffness. In some embodiments, the second parameter is associated with at least one of a weather condition or an ambient visibility. In some embodiments, the first parameter is associated with an implement operated by the off-road vehicle. In some embodiments, the perception zone is generated based on historical information. In some embodiments, the off-road vehicle is an agricultural vehicle. In some embodiments, the off-road vehicle is a construction vehicle. In some embodiments, controlling the off-road vehicle to avoid the obstacle using the perception zone includes at least one of causing the off-road vehicle to change in speed or causing the off-road vehicle to change in direction. In some embodiments, controlling the off-road vehicle to avoid the obstacle using the perception zone is performed autonomously without user input.

Another embodiment of the present disclosure relates to a method of obstacle avoidance for an off-road vehicle including receiving a first parameter associated with a characteristic of the off-road vehicle, receiving a second parameter associated with a characteristic of an environment of the off-road vehicle, generating, based on the first and second parameters, a perception zone for the off-road vehicle, controlling the off-road vehicle to avoid an obstacle using the perception zone, receiving an indication of a change in at least one of the first parameter or the second parameter, and updating the perception zone based on the change in the at least one of the first parameter or the second parameter.

In some embodiments, the first parameter is associated with a mass of the off-road vehicle. In some embodiments, the first parameter is associated with at least one of a component health of a component in the off-road vehicle or an implement operated by the off-road vehicle. In some embodiments, the second parameter is associated with a characteristic of ground the off-road vehicle is operating on. In some embodiments, the off-road vehicle is an agricultural vehicle. In some embodiments, the off-road vehicle is a construction vehicle. In some embodiments, controlling the off-road vehicle to avoid the obstacle using the perception zone is performed autonomously without user input and includes at least one of causing the off-road vehicle to change in speed or causing the off-road vehicle to change in direction.

Another embodiment of the present disclosure relates to a non-transitory computer-readable storage medium having instructions stored thereon that, when executed by a processor, cause the processor to receive a first parameter associated with a characteristic of an off-road vehicle, receive a second parameter associated with a characteristic of an environment of the off-road vehicle, generate, based on the first and second parameters, a perception zone for the off-road vehicle, control the off-road vehicle to avoid an obstacle using the perception zone, receive an indication of a change in at least one of the first parameter or the second parameter, and update the perception zone based on the change in the at least one of the first parameter or the second parameter.

BRIEF DESCRIPTION OF THE DRAWINGS

The above and other aspects and features of the present disclosure will become more apparent to those skilled in the art from the following detailed description of the example embodiments with reference to the accompanying drawings.

FIGS. 4A-B are diagrams illustrating the vehicle perception zone of FIG. 2 changing based on vehicle operation characteristics, according to an exemplary embodiment.

DETAILED DESCRIPTION

Referring generally to the FIGURES, described herein are systems and methods of a vehicle control system. In various embodiments, the vehicle control system generates dynamic perception zones to facilitate obstacle avoidance. The term "perception zone" as used herein may refer to a modeled zone associated with vehicles, trailers, implements, and/or accessories that may be used for path planning and/or obstacle avoidance. The perception zone may represent an area within which a presence of an obstacle causes the vehicle control system to change operation of the vehicle, trailer, implement, and/or accessory. For example, a vehicle control system associated with a hauling vehicle may cause the hauling vehicle to slow down and/or change directions when an obstacle such as a large rock enters a perception zone associated with the hauling vehicle. To extend the example, the vehicle control system may not react to an obstacle outside the perception zone such as a tree located outside the perception zone in a neighboring farm field. Perception zones are discussed in greater detail below. In various embodiments, the vehicle control system of the present disclosure dynamically modifies the perception zone based on vehicle and/or environmental parameters. For example, in an agricultural context, a hauling vehicle (e.g., a tractor-trailer, etc.) may generate a dynamic perception zone that changes in size based on a speed of the vehicle and/or ground conditions (e.g., an amount of friction, etc.) associated with soil the vehicle is operating on. As another example, in a construction context, a hauling vehicle (e.g., a dump truck, etc.) may generate a dynamic perception zone that changes in size based on component wear associated with the vehicle (e.g., component wear associated with the vehicle's brakes, etc.). In various embodiments, the perception zone facilitates obstacle avoidance such as avoiding crop, trees, other vehicles, and the like. For example, the vehicle control system described herein may cause a vehicle to slow down, change directions, and/or stop as a result of identifying an obstacle within a perception zone of the vehicle.

Figure 1:
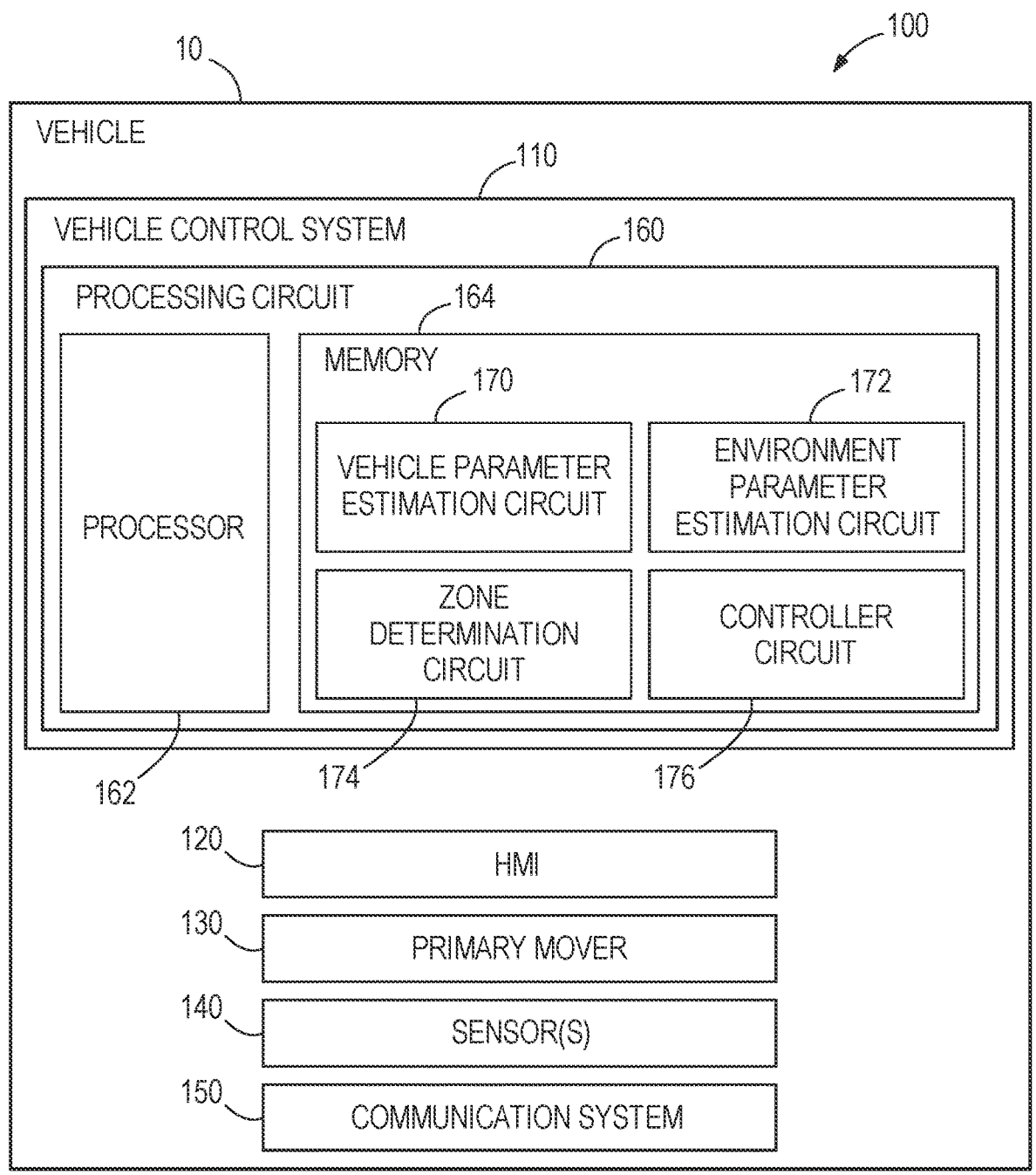
FIG. 1 is a block diagram of a vehicle having a vehicle control system, according to an exemplary embodiment.

Hereinafter, example embodiments will be described in more detail with reference to the accompanying drawings. Referring now to FIG. 1, a block diagram of a control environment 100 is shown, according to an exemplary embodiment. Control environment 100 is shown to include vehicle 10. In various embodiments, vehicle 10 is an agricultural vehicle. For example, vehicle 10 may be or include a hauling vehicle (e.g., a tractor-trailer, etc.), a harvesting vehicle (e.g., a combine harvester, etc.), and/or the like. While the vehicle control system of the present disclosure is described in relation to agricultural vehicles, it should be understood that the vehicle control system is usable with other vehicles (e.g., non-agricultural vehicles) and that such embodiments are within the scope of the present disclosure. As a non-limiting example, in a landscaping context, vehicle 10 may be a lawn mower. As another non-limiting example, in a snow-clearing context, vehicle 10 may be a winter service vehicle including a snowplow. As another non-limiting example, in a construction context, vehicle 10 may be an excavation vehicle such as a bulldozer, loader (e.g., front loader, backhoe loader, track loader, etc.), power shovel, front shovel, and/or the like. As another non-limiting example, vehicle 10 may be a utility vehicle (e.g., a truck such as a Class 1 light pickup truck, etc.), an irrigation vehicle (e.g., a linear move irrigation system, etc.), and/or the like.

Vehicle 10 includes vehicle control system 110, human-machine interface (HMI) 120, primary mover 130, sensor(s) 140, and communication system 150. Vehicle control system 110 may generate the dynamic perception zones described herein. In various embodiments, vehicle control system 110 is physically located with vehicle 10. For example, vehicle control system 110 may be or include a hardware component installed in vehicle 10. Additionally or alternatively, part or all of vehicle control system 110 may be located separately of vehicle 10. For example, vehicle control system 110 may be or include a remote processing system (e.g., a server, two or more computing systems/servers in a distributed computing implementation, a cloud-based processing system, etc.) configured to receive input from control environment 100 and control vehicle 10 remotely.

HMI 120 may facilitate user interaction with vehicle 10 and/or vehicle control system 110. HMI 120 may include elements configured to present information to a user and receive user input. For example, HMI 120 may include a display device (e.g., a graphical display, a touchscreen, etc.), an audio device (e.g., a speaker, etc.), manual controls (e.g., manual steering control, manual transmission control, manual braking control, etc.), and/or the like. HMI 120 may include hardware and/or software components. For example, HMI 120 may include a microphone configured to receive user voice input and a software component configured to control vehicle 10 based on the received user voice input. In various embodiments, HMI 120 presents information associated with the operation of vehicle 10 and/or vehicle control system 110 to a user and facilitates user control of operating parameters. For example, HMI 120 may display operational parameters (e.g., fuel level, seed level, penetration depth of ground engaging tools, guidance swath, etc.) on a touchscreen display and receive user control input via the touchscreen display.

Primary mover 130 may generate mechanical energy to operate vehicle 10. For example, primary mover 130 may be or include an internal combustion engine. Additionally or alternatively, primary mover 130 may be or include an electric motor. In various embodiments, primary mover 130 is coupled to a frame of vehicle 10 and configured to provide power to a plurality of tractive elements (e.g. wheels, etc.). In various embodiments, primary mover 130 utilizes one or more fuels and/or energy storage systems (e.g., rechargeable batteries, etc.). For example, primary mover 130 may utilize diesel, gasoline, propane, natural gas, hydrogen, lithium-ion batteries, nickel-metal hydride batteries, lithium-ion polymer batteries, lead-acid batteries, nickel-cadmium batteries, and/or the like.

Sensor(s) 140 may monitor one or more parameters associated with vehicle 10. For example, sensor(s) 140 may monitor operation of primary mover 130 (e.g., torque, temperature, fuel level, airflow, etc.). Additionally or alternatively, sensor(s) 140 may monitor an environment of vehicle 10. For example, sensor(s) 140 may include cameras to view the surroundings of vehicle 10 and perform object recognition to facilitate obstacle avoidance. Sensor(s) 140 may include engine sensors, transmission sensors, chassis sensors, safety sensors, driver assistance sensors, passenger comfort sensors, entertainment systems sensors, and/or the like. In various embodiments, sensor(s) 140 monitor motion parameters associated with vehicle 10. For example, sensor(s) 140 may include a geolocation sensor (e.g., a GPS receiver, satellite navigation transceiver, etc.) configured to monitor a speed and/or bearing of vehicle 10. In some embodiments, sensor(s) 140 receive input from external sources. For example, sensor(s) 140 may include position sensors configured to communicate with one or more beacons located throughout a farm field to determine motion characteristics (e.g., speed, bearing, etc.) of vehicle 10. In various embodiments, sensor(s) 140 are physically located with vehicle 10. For example, sensor(s) 140 may include a chassis mounted infra-red sensor configured to measure soil compaction. Additionally or alternatively, sensor(s) 140 may be located separately of vehicle 10. For example, sensor(s) 140 may include a moisture sensor configured to measure soil moisture remotely of vehicle 10. Sensor(s) 140 may include hardware and/or software components. For example, sensor(s) 140 may include an accelerometer configured to determine acceleration data and a software component configured to determine motion characteristics associated with vehicle 10 (e.g., pose, speed, yaw, trajectory, etc.) based on the acceleration data. As another example, sensor(s) 140 may include an optical device (e.g., a camera, LIDAR sensor, etc.) configured to capture image data and a software component configured to classify obstacles based on the image data.

Communication system 150 may facilitate communication between vehicle 10 and external systems (e.g., other vehicles, a control system, sensors, etc.). Communication system 150 may be or include wired or wireless communications interfaces (e.g., jacks, antennas, transmitters, receivers, transceivers, wire terminals, etc.) for conducting data communications within control environment 100 and/or with other external systems or devices. In various embodiments, communications via communication system 150 is direct (e.g., local wired or wireless communications). Additionally or alternatively, communications via communication system 150 may utilize a network (e.g., a WAN, the Internet, a cellular network, a vehicle-to-vehicle network, etc.). For example, vehicle control system 110 may communicate with a decision support system (DSS) using a 4G and/or 5G connection (e.g., via a 4G or 5G access point/small cell base station, etc.) and may communicate with another vehicle using a dedicated short-range communication channel (e.g., a vehicular ad-hoc network, etc.). In some embodiments, communication system 150 facilitates vehicle-to-vehicle (V2V) and/or vehicle-to-everything (V2X) communication. For example, communication system 150 may facilitate communication between vehicle 10 and another vehicle using the IEEE 802.11p standard (e.g., a wireless access in vehicular environments (WAVE) vehicular communication system). In some embodiments, vehicle 10 communicates with external systems (e.g., other vehicles, etc.) via Wi-Fi.

Referring now generally to vehicle control system 110, vehicle control system 110 offers many benefits over existing systems. Conventional off-road vehicle control systems typically lack dynamic perception zones. For example, a conventional vehicle control system for a harvesting vehicle may lack a dynamic perception zone that is updated based on vehicle and/or environmental parameters. However, vehicle control system 110 described herein facilitates dynamic perception zones. That is, the dynamic perception zones generated by vehicle control system 110 may update (e.g., change in size, change in strength, change in type, etc.) based on vehicle and/or environmental parameters, thereby reducing downtime associated with unnecessary obstacle avoidance (e.g., false positives, etc.) while maintaining robust vehicle safety. As a non-limiting example, in a commercial orchard context, a conventional vehicle control system may use a static perception zone designed for a wide-open space such as a farm field that causes a hauling vehicle to stop unnecessarily because of a close proximity of trees in the orchard, thereby introducing unnecessary delays. As another non-limiting example, in a commercial feedlot context, a conventional vehicle control system may use a static perception zone that does not account for extension/retraction of an unloading auger, thereby causing the unloading auger of a feed vehicle to collide with a cattle barn during feeding. However, vehicle control system 110 may generate dynamic perception zones that are updated based on vehicle and/or environmental parameters, thereby reducing unnecessary delays and maintaining vehicle safety. For example, vehicle control system 110 may generate a dynamic perception zone that becomes more conservative (e.g., grows in size, etc.) while a vehicle is operating on a slope (e.g., a hill, etc.), thereby ensuring that the vehicle has ample time to avoid obstacles such as rocks or trees.

In various embodiments, vehicle control system 110 offers benefits over existing obstacle avoidance systems. Conventional obstacle avoidance systems, such as those implemented in a self-driving car, typically neglect a number of characteristics that are crucial in off-road contexts. For example, a conventional obstacle avoidance system may generate a perception zone that does not account for a changing vehicle weight. However, as an example, in an agricultural context a grain cart may receive over 150,000 lbs. in grain, several times the weight of the empty grain cart, thereby greatly altering the stopping characteristics of the grain cart. As a further example, a harvesting vehicle may operate in loose soil (e.g., uncompacted soil, etc.) or wet soil that may greatly alter the turning characteristics of the harvesting vehicle. Therefore, conventional obstacle avoidance systems, such as those implemented in a self-driving car, may fail to accurately function in an off-road context (e.g., by generating inaccurate perception zones, etc.). However, vehicle control system 110 may generate dynamic perception zones that are updated based on vehicle and/or environmental parameters not accounted for in conventional obstacle avoidance systems. For example, vehicle control system 110 may generate a dynamic perception zone that accounts for ground engagement associated with an attached implement (e.g., a cultivator, etc.), thereby reducing the required stopping distance of a vehicle (e.g., reducing a size of an associated perception zone, etc.) because of the stopping power associated with the ground engagement.

Referring still to FIG. 1, vehicle control system 110 is shown to include processing circuit 160 having processor 162 and memory 164. In some embodiments, vehicle control system 110 includes one or more processing circuits 160 including one or more processors 162 and one or more memories 164. Each of processors 162 can be a general purpose or specific purpose processor, an application specific integrated circuit (ASIC), one or more field programmable gate arrays (FPGAs), a group of processing components, or other suitable processing components. Each of processors 162 is configured to execute computer code or instructions stored in memory 164 or received from other computer readable media (e.g., CDROM, network storage, a remote server, etc.).

Memory 164 may include one or more devices (e.g., memory units, memory devices, storage devices, or other computer-readable media) for storing data and/or computer code for completing and/or facilitating the various processes described in the present disclosure. Memory 164 may include random access memory (RAM), read-only memory (ROM), hard drive storage, temporary storage, non-volatile memory, flash memory, optical memory, or any other suitable memory for storing software objects and/or computer instructions. Memory 164 may include database components, object code components, script components, or any other type of information structure for supporting the various activities and information structures described in the present disclosure. Memory 164 may be communicably connected to processor(s) 162 via processing circuit 160 and may include computer code for executing (e.g., by processor 162) one or more of the processes described herein.

Memory 164 is shown to include vehicle parameter estimation circuit 170, environmental parameter estimation circuit 172, zone determination circuit 174, and controller circuit 176. Vehicle parameter estimation circuit 170 may estimate vehicle parameters. For example, vehicle parameter estimation circuit 170 may receive accelerometer data from an accelerometer and generate a motion parameters (e.g., speed, etc.) for vehicle 10. In various embodiments, vehicle parameter estimation circuit 170 generates motion parameters for vehicle 10. For example, vehicle parameter estimation circuit 170 may generate a speed, an acceleration, a heading, and/or the like for vehicle 10. In various embodiments, vehicle parameter estimation circuit 170 generates spatial parameters for vehicle 10. For example, vehicle parameter estimation circuit 170 may generate a location (e.g., a latitude and/or longitude, etc.), a size (e.g., physical boundaries of vehicle 10 and/or any trailers and/or implements, etc.), a yaw, a pitch, a roll, and/or the like for vehicle 10. In various embodiments, vehicle parameter estimation circuit 170 generates physical parameters for vehicle 10. For example, vehicle parameter estimation circuit 170 may generate a weight, a weight distribution, an inertia, a wind resistance, a drag (e.g., associated with an implement, etc.), a tire cornering stiffness, and/or the like for vehicle 10. In various embodiments, vehicle parameter estimation circuit 170 generates lifetime parameters for vehicle 10. For example, vehicle parameter estimation circuit 170 may generate a tire wear, a brake wear, an engine wear, a brake fluid level, an operating hours level, a mileage, a sensor accuracy, and/or the like for vehicle 10. In various embodiments, vehicle parameter estimation circuit 170 generates operational parameters for vehicle 10. For example, vehicle parameter estimation circuit 170 may determine whether an unloading auger of vehicle 10 is extended, whether headlights of vehicle 10 are turned on, whether a cultivator of vehicle 10 is currently engaging the ground (and to what extent it is engaging, etc.), whether all-wheel drive is engaged, what tires are currently installed, and/or the like. In various embodiments, vehicle parameter estimation circuit 170 generates event parameters for vehicle 10. For example, vehicle parameter estimation circuit 170 may determine if a slip event occurs, if a differential lock event occurs, if a tire suddenly loses pressure (e.g., as the result of running over an obstacle such as deer antlers, etc.), and/or the like.

In various embodiments, vehicle parameters are measured directly (e.g., by one of sensor(s) 140, etc.). Additionally or alternatively, vehicle parameter estimation circuit 170 may determine a vehicle parameter indirectly. For example, vehicle parameter estimation circuit 170 may estimate a weight of vehicle 10 based on a harvest volume. As another example, vehicle parameter estimation circuit 170 may estimate a remaining braking efficiency based on the operating hours accumulated since a brake component was last replaced. In various embodiments, vehicle parameter estimation circuit 170 generates a confidence interval associated with a vehicle parameter. For example, vehicle parameter estimation circuit 170 may generate a 90% confidence interval for an estimated remaining braking efficiency. In some embodiments, vehicle parameter estimation circuit 170 may update future estimations based on received information. For example, vehicle parameter estimation circuit 170 may estimate a 90% confidence interval for a remaining brake pad material associated with a brake of vehicle 10 to be between 5-15 cm (e.g., the amount of usable brake pad material before the brake needs to be replaced, etc.) and may update future estimations based on receiving an input from a mechanic that the brake pad was replaced having only 3 cm of remaining brake pad material. It should be understood that while vehicle parameter estimation circuit 170 is described in relation to vehicle 10, vehicle parameter estimation circuit 170 may generate parameters associated with a trailer, an implement, and/or any other accessory of vehicle 10 (e.g., a grain cart, a cultivator, etc.).

Environment parameter estimation circuit 172 may estimate environmental parameters. For example, environment parameter estimation circuit 172 may receive accelerometer data from an accelerometer and generate a soil friction coefficient associated with soil vehicle 10 is operating on. In various embodiments, environment parameter estimation circuit 172 generates ground parameters. For example, environment parameter estimation circuit 172 may generate a ground moisture estimation, a ground compaction estimation, a ground friction coefficient, a ground consistency estimation, and/or the like. In various embodiments, environment parameter estimation circuit 172 generates weather parameters. For example, environment parameter estimation circuit 172 may generate a precipitation level, an ambient sunlight measurement, and/or the like. In various embodiments, environment parameter estimation circuit 172 generates contextual parameters. For example, environment parameter estimation circuit 172 may track a number and/or frequency of recently encountered obstacles, an operator safety factor (e.g., a safety factor determined by an operator, etc.), a crop yield, an amount of visible light, a time of day, operation of other vehicles (e.g., an amount of nearby activity, etc.), and/or the like. In some embodiments, environment parameter estimation circuit 172 estimates a ground engagement (e.g., a stopping force, etc.) of an implement (e.g., a cultivator, etc.). Estimation of ground parameters is described in detail with reference to U.S. patent application Ser. No. 16/882,193, filed on May 22, 2020, the entire disclosure of which is incorporated by reference herein.

In various embodiments, environmental parameters are measured directly (e.g., by one of sensor(s) 140, etc.). Additionally or alternatively, environment parameter estimation circuit 172 may determine an environmental parameter indirectly. For example, environment parameter estimation circuit 172 may estimate a ground friction coefficient based on an amount of rainfall. In various embodiments, environment parameter estimation circuit 172 generates a confidence interval associated with an environmental parameter. For example, environment parameter estimation circuit 172 may generate a 90% confidence interval for an estimated ground friction coefficient. In some embodiments, environment parameter estimation circuit 172 may update future estimations based on received information (e.g., as described above, etc.). It should be understood that while environment parameter estimation circuit 172 is described in relation to vehicle 10, environment parameter estimation circuit 172 may generate parameters associated with a trailer, an implement, and/or any other accessory of vehicle 10 (e.g., a grain cart, a cultivator, etc.) such as a stopping force associated with ground a cultivator is engaged with.

Zone determination circuit 174 may generate a dynamic perception zone. In various embodiments, zone determination circuit 174 generates a dynamic perception zone using inputs from vehicle parameter estimation circuit 170 and/or environment parameter estimation circuit 172. In various embodiments, zone determination circuit 174 updates the dynamic perception zone based on vehicle and/or environmental parameters. For example, zone determination circuit 174 may update a dynamic perception zone associated with a hauling vehicle in response to the hauling vehicle being loaded with grain to change the dynamic perception zone from being substantially circular to being substantially oblong in the direction of travel, thereby increasing the stopping distance associated with the hauling vehicle. As another example, zone determination circuit 174 may generate a first dynamic perception zone that is substantially circular for a vehicle traveling at a first speed and may generate a second dynamic perception zone that is elongated in the direction of travel to be substantially oblong for a vehicle traveling at a second speed greater than the first speed. In various embodiments, zone determination circuit 174 generates dynamic perception zones based on vehicle characteristics. For example, zone determination circuit 174 may generate a dynamic perception zone for a harvesting vehicle with a retracted unloading auger that is substantially rectangular and may update the dynamic perception zone to be substantially oblong in response to the harvesting vehicle extending the unloading auger. In various embodiments, the dynamic perception zones generated by zone determination circuit 174 facilitates obstacle avoidance and/or path planning. For example, vehicle control system 110 may use a dynamic perception zone associated with vehicle 10 to operate vehicle 10 to avoid obstacles (e.g., obstacles that come within the dynamic perception zone, etc.).

Controller circuit 176 may facilitate control of vehicle 10. For example, controller circuit 176 may receive a dynamic perception zone from zone determination circuit 174 and generate control signals for primary mover 130 to operate vehicle 10 to avoid obstacles within the dynamic perception zone. In some embodiments, controller circuit 176 may facilitate autonomous and/or semi-autonomous operation of vehicle 10. For example, controller circuit 176 may operate vehicle 10 autonomously while receiving obstacle avoidance data (e.g., location information for detected obstacles, etc.) from sensor(s) 140 and avoiding obstacles that come within the dynamic perception zone. Additionally or alternatively, controller circuit 176 may receive information from external sources and operate vehicle 10 based on the received information. For example, controller circuit 176 may receive a route from an external controller (e.g., a cloud-based control system, etc.) and operate vehicle 10 based on the received route.

Figure 2:
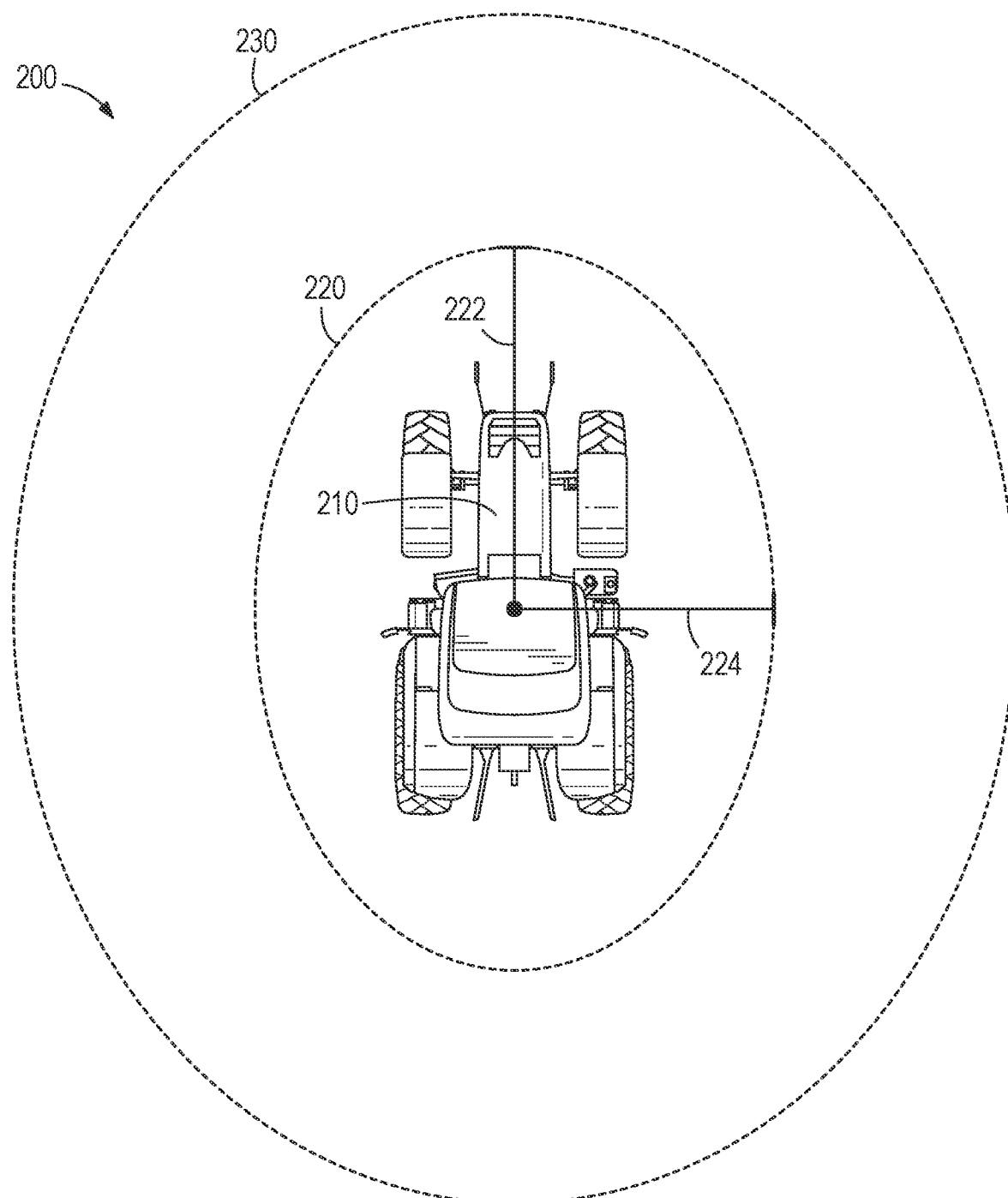
FIG. 2 is a diagram illustrating a vehicle perception zone, according to an exemplary embodiment.

Referring now to FIG. 2, a diagram illustrating dynamic perception zone 200 is shown, according to an exemplary embodiment. Dynamic perception zone 200 may facilitate obstacle avoidance and/or path planning for vehicle 210. For example, vehicle control system 110 may detect (e.g., using sensor(s) 140, etc.) one or more obstacles nearby vehicle 210 and in response to the one or more obstacles interacting with (e.g., being within, etc.) dynamic perception zone 200, may operate vehicle 210 to avoid the one or more obstacles. In various embodiments, dynamic perception zone 200 includes first zone 220 and second zone 230. In various embodiments, vehicle control system 110 may stop vehicle 210 in response to detecting an obstacle within first zone 220. In various embodiments, vehicle control system 110 may slow and/or avoid (e.g., by steering away, etc.) an obstacle detected within second zone 230. In various embodiments, dynamic perception zone 200 includes a different number of sub-zones (e.g., first zone 220, second zone 230, etc.). For example, dynamic perception zone 200 may include 15 different sub-zones each associated with a different avoidance level (e.g., a different amount of braking force, etc.). Additionally or alternatively, dynamic perception zone 200 (or a sub-zone thereof) may include a gradient (e.g., a continuous number of sub-zones, etc.). For example, a first obstacle within dynamic perception zone 200 and located a first distance from vehicle 210 may cause vehicle 210 to apply a first braking force and a second obstacle within dynamic perception zone 200 and located a second distance from vehicle 210 that is smaller than the first distance may cause vehicle 210 to apply a second braking force that is greater than the first braking force. In various embodiments, dynamic perception zone 200 (or a sub-zone thereof) includes size and/or shape parameters. For example, first zone 220 may include vertical component 222 and horizontal component 224. It should be understood that while dynamic perception zone 200 is shown as uniform with respect to vehicle 210, dynamic perception zones of the present disclosure may take on any shape and/or size (e.g., a non-uniform shape, etc.) and may be expressed in any coordinate system (e.g., Polar, Cartesian, etc.) with respect to any point (e.g., with respect to a point on vehicle 210, with respect to an obstacle, etc.). For example, dynamic perception zone 200 may include a plurality of components extending radially from a center of vehicle 210 and each of the plurality of components may be controlled independently. In some embodiments, dynamic perception zone 200 is 2-dimensional (e.g., exists in a plane parallel with the ground, etc.). Additionally or alternatively, dynamic perception zone 200 may be of a higher dimension, such as 3-dimensional. In various embodiments, vehicle control system 110 updates aspects of dynamic perception zone 200 independently. For example, vehicle control system 110 may change a vertical component of first zone 220 (e.g., vertical component 222) independently of a vertical component of second zone 230.

Figure 3B:
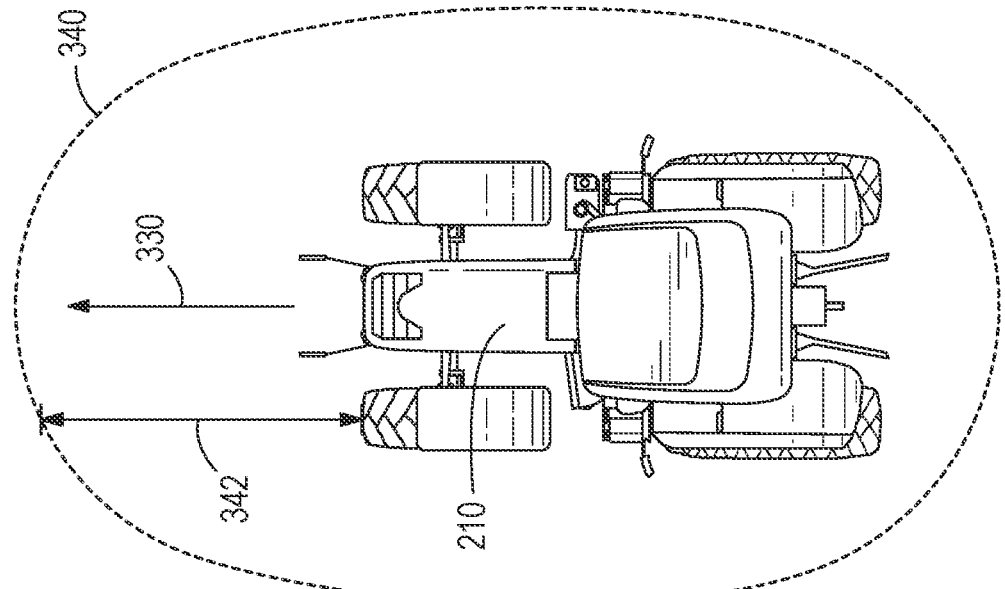
FIGS. 3A-B are diagrams illustrating the vehicle perception zone of FIG. 2 changing based on vehicle motion characteristics, according to an exemplary embodiment.
Figure 3A:
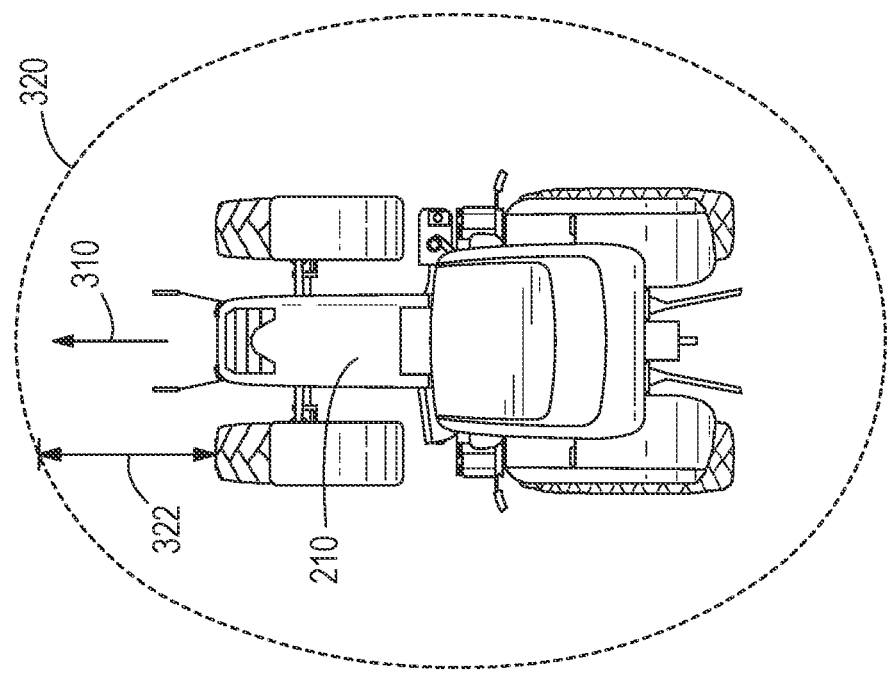

Referring now to FIGS. 3A-6, updating dynamic perception zones in response to vehicle and/or environmental parameters is discussed, according to several exemplary embodiments. In various embodiments, vehicle control system 110 changes a dynamic perception zone based on vehicle motion parameters. For example, as shown in FIGS. 3A and 3B, vehicle control system 110 may generate first dynamic perception zone 320 associated with vehicle 210 traveling at first speed 310 having first vertical component 322 and may update first dynamic perception zone 320 to second dynamic perception zone 330 having second vertical component 342 that is larger than first vertical component 322 in response to vehicle 210 increasing in speed to second speed 330. It should be understood that while first vertical component 322 and second vertical component 342 are shown with respect to a front of vehicle 210, first vertical component 322 and second vertical component 342 may be with respect to any other point on vehicle 210. For example, first vertical component 322 and second vehicle component 342 may be with respect with a back of vehicle 210 (e.g., if vehicle 210 was operating in reverse, etc.). In some embodiments, vehicle control system 110 updates a dynamic perception zone based on a position and/or orientation of vehicle 10. For example, vehicle control system 110 may generate a first dynamic perception zone for vehicle 10 when vehicle 10 is operating on flat (e.g., level, etc.) ground and may update the first dynamic perception zone to a second dynamic perception zone that is wider than the first dynamic perception zone (e.g., has more space to the left and/or right of the direction of travel of vehicle 10, etc.) in response to vehicle 10 operating on a slope (e.g., in order to account for reduced turning ability on the slope, etc.). In some embodiments, vehicle control system 110 updates a dynamic perception zone based on events. For example, vehicle control system 110 may receive an indication that a LIDAR sensor associated with an obstacle avoidance system has failed and may update a dynamic perception zone based on the indication (e.g., to expand the dynamic perception zone for increased safety, etc.).

In various embodiments, vehicle control system 110 changes a dynamic perception zone based on operation parameters of vehicle 10. For example, as shown in FIGS.

Figure 5:
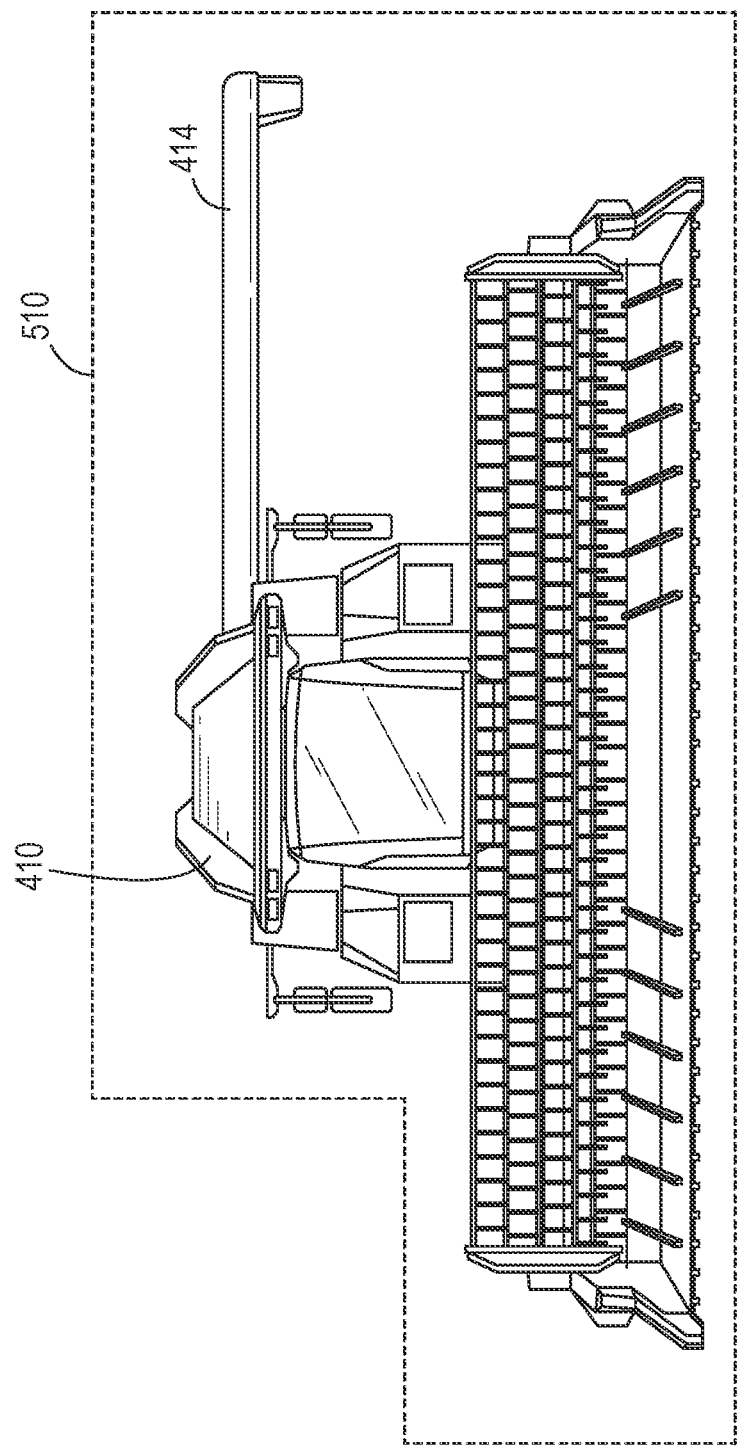
FIG. 5 is a diagram illustrating a vertical component of the vehicle perception zone of FIG. 2, according to an exemplary embodiment.

4A and 4B, vehicle control system 110 may generate third dynamic perception zone 420 associated with harvesting vehicle 410 having retracted unloading auger 412 and may update third dynamic perception zone 420 to fourth dynamic perception zone 430 to accommodate extended unloading auger 414 in response to harvesting vehicle 410 extending retracted unloading auger 412. Similarly, as shown in FIG. 5, vehicle control system 110 may update 3-dimensional dynamic perception zone 510 that accommodates extended unloading auger 414 based on harvesting vehicle 410 extending retracted unloading auger 412. In various embodiments, vehicle control system 110 generates a dynamic perception zone based on lifetime parameters. For example, vehicle control system 110 may generate a 90% confidence interval associated with a remaining braking capacity of a vehicle based on estimated brake wear (e.g., deterioration of brake pads based on operation hours, etc.) and may update a dynamic perception zone based on the 90% confidence interval (e.g., by expanding the dynamic perception zone to account for the reduced braking capacity, etc.). In some embodiments, vehicle control system 110 generates a dynamic perception zone based on estimated sensor accuracy. For example, vehicle control system 110 may determine that a LIDAR sensor is 70% accurate (e.g., based on component degradation, manufacturer specification, past experience, etc.) and/or is accurate within +/−3 feet and may update a dynamic perception zone based on the information (e.g., to expand the perception zone for safety, etc.).

Figure 6:
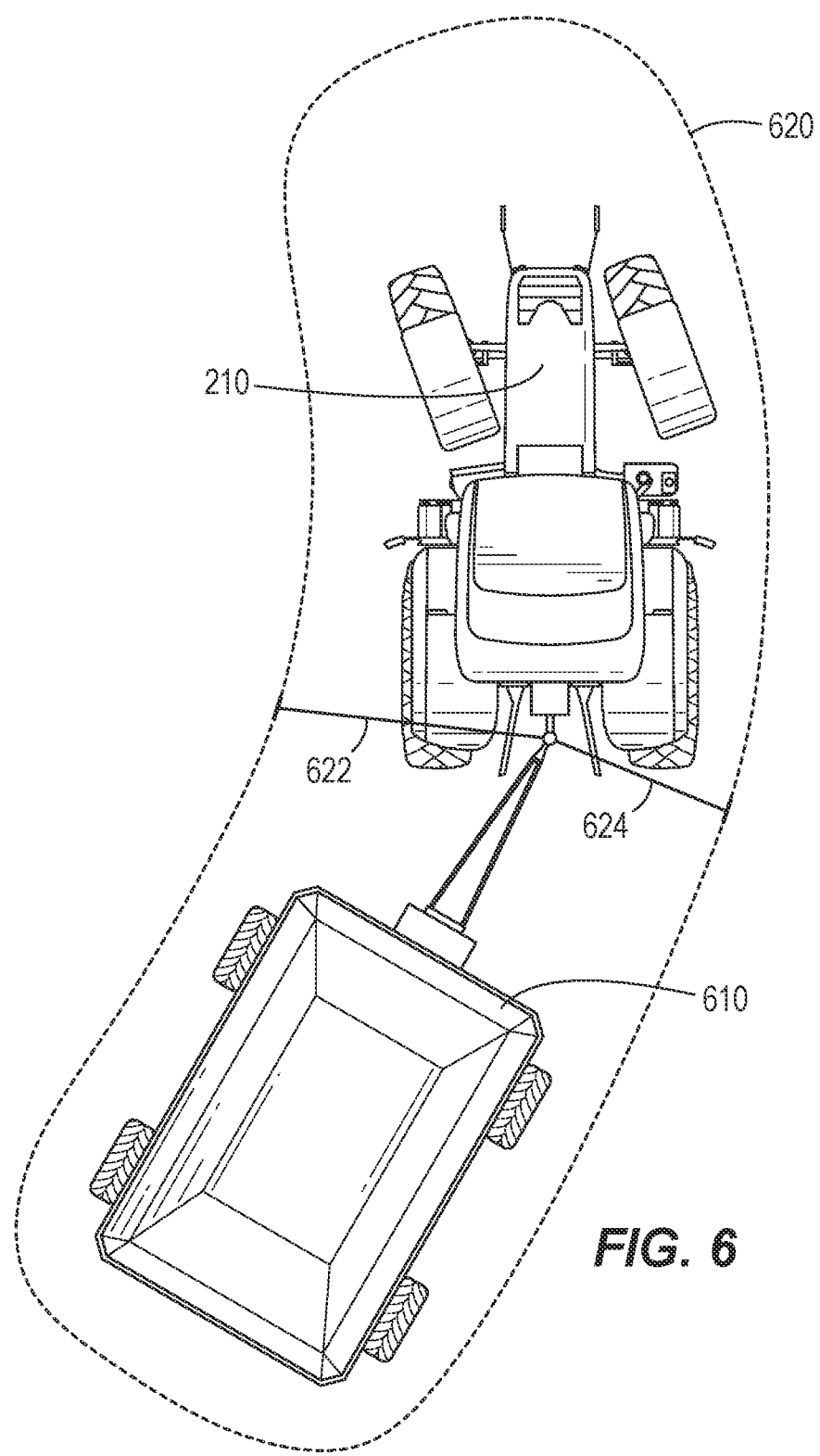
FIG. 6 is a diagram illustrating the vehicle perception zone of FIG. 2 changing based on implement characteristics, according to an exemplary embodiment.

In various embodiments, vehicle control system 110 changes a dynamic perception zone based on physical parameters associated with a trailer and/or implement associated with vehicle 10. For example, as shown in FIG. 6, vehicle control system 110 may generate sixth dynamic perception zone 620 associated with vehicle 210 towing grain cart 610 having first width component 622 and second width component 624 that is smaller than first width component 622 to account for a turning radius of grain cart 610 towed by vehicle 210. In various embodiments, vehicle control system 110 may change a dynamic perception zone based on a ground engagement of an implement such as a cultivator. For example, vehicle control system 110 may change a dynamic perception zone (e.g., by shortening a distance that the dynamic perception zone extends in front of the vehicle, etc.) associated with a hauling vehicle in response to a cultivator towed by the hauling vehicle engaging the ground (e.g., because of the greater stopping force associated with the ground engagement, etc.). In various embodiments, vehicle control system 110 updates a dynamic perception zone based on receiving an indication that a trailer and/or implement has been attached to vehicle 10. For example, vehicle control system 110 may expand a dynamic perception zone in response to determining that a grain cart having a current loaded weight of 155,000 lbs. has been attached to vehicle 10. To extend the example, vehicle control system 110 may contract the dynamic perception zone in response to the grain cart being unloaded, thereby shortening the braking distance of vehicle 10 with attached grain cart. In various embodiments, vehicle control system 110 may change a dynamic perception zone based on a type of implement attached to vehicle 10. For example, vehicle control system 110 may generate a first dynamic perception zone in response to attaching a 12-row planter and may generate a second dynamic perception zone in response to attaching an 18-row planter.

In various embodiments, vehicle control system 110 updates a dynamic perception zone based on environmental parameters. As a non-limiting example, vehicle control system 110 may generate a first dynamic perception zone in dry conditions and may update the first dynamic perception zone to a second dynamic perception zone that is larger than the first dynamic perception zone based on rainfall (e.g., to account for tire slip and/or reduced braking power, etc.). As another non-limiting example, vehicle control system 110 may generate a first dynamic perception zone based on a first ambient particulate level (e.g., dust in the air, etc.) and may update the first dynamic perception zone to a second dynamic perception zone that is larger in the direction of travel than the first dynamic perception zone based on an increase in the ambient particulate level (e.g., to account for reduced sensor accuracy, etc.).

In various embodiments, vehicle control system 110 operates vehicle 10 based on a dynamic perception zone. Speaking generally, dynamic perception zones as described herein may be substantially similar to magnetic fields such that when an obstacle is located sufficiently close to a dynamic perception zone, a modeled force repelling vehicle 10 from the obstacle associated with the dynamic perception zone is generated that is similar to the repulsive force between two sufficiently close magnetic poles of the same orientation (e.g., north, south). In various embodiments, the dynamic perception zones include a gradient. For example, a dynamic perception zone may include a gradient having an outer extent and an inner extent. The inner extent may correspond to the center of the dynamic perception zone and the outer extent may be a distance away from the inner extent (e.g., 20 feet out from the inner extent, etc.). The gradient may include a number of levels between the inner extent and the outer extent. For example, ten discrete levels may exist between the inner extent and the outer extent. Additionally or alternatively, the number of levels may be continuous. Each level may correspond to a modeled repulsive force. For example, an object at a first level corresponding to first distance from the inner extent may experience a first modeled repulsive force and the object at a second level corresponding to a second distance from the inner extent that is farther than the first distance from the inner extent may experience a second modeled repulsive force that is less than the first modeled repulsive force. In various embodiments, the modeled repulsive forces are used to perform obstacle avoidance and/or path planning. For example, vehicle control system 110 may use the modeled repulsive forces in an obstacle avoidance algorithm.

Figure 7:
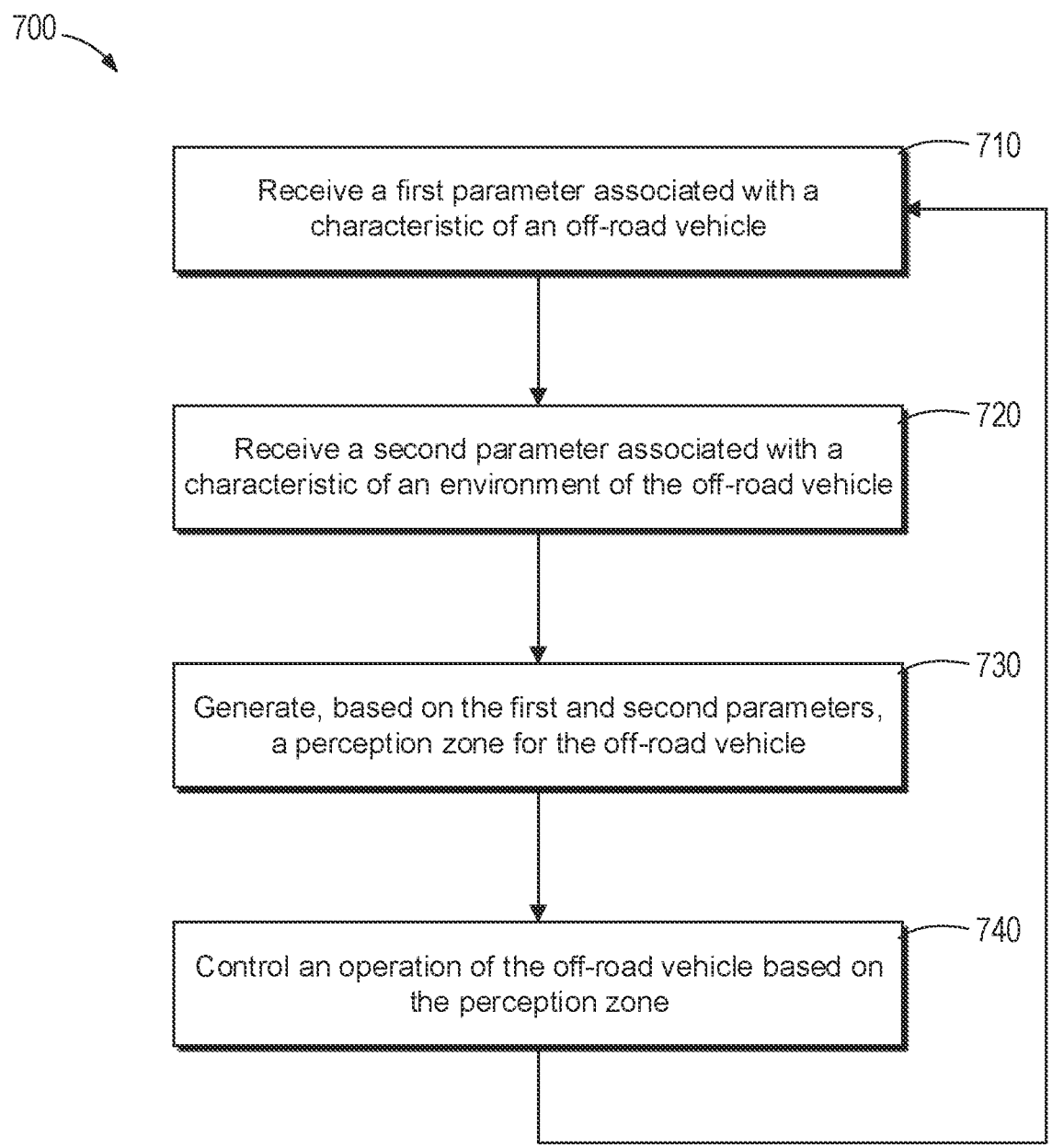
FIG. 7 is a flow diagram of a method of generating a vehicle perception zone and operating a vehicle, according to an exemplary embodiment.

Referring now to FIG. 7, method 700 for generating a dynamic perception zone and operating a vehicle is shown, according to an exemplary embodiment. In various embodiments, vehicle control system 110 performs method 700. At step 710, vehicle control system 110 receives a first parameter associated with a characteristic of an off-road vehicle. The first parameter may include a motion parameter of vehicle 10, a position indication (e.g., a yaw, pitch, and/or roll of vehicle 10, whether vehicle 10 is operating on a slope, etc.), an indication of an attached implement, a weight of vehicle 10, an indication of component degradation, an indication of an event associated with vehicle 10 (e.g., such as a sudden loss of tire pressure or a differential lock event, etc.), a cornering stiffness associated with tires of vehicle 10, an indication of a level of ground engagement associated with an implement operated by vehicle 10, and/or the like. In some embodiments, the first parameter is received from external sources. Additionally or alternatively, the first parameter may be generated by vehicle 10 (e.g., by sensor(s) 140, etc.). At step 720, vehicle control system 110 receives a second parameter associated with a characteristic of an environment of the off-road vehicle. The second parameter may include a weather parameter (e.g., an amount of precipitation, etc.), an ambient particulate level, an indication of ground compaction, and/or the like. In some embodiments, the second parameter is received from external sources. Additionally or alternatively, the second parameter may be generated by vehicle 10 (e.g., by sensor(s) 140, etc.).

At step 730, vehicle control system 110 generates a perception zone for the off-road vehicle based on the first and/or second parameters. In some embodiments, step 730 includes updating an existing perception zone. For example, vehicle control system 110 may update a perception zone for vehicle 10 to extend an area of the perception zone in the direction of travel of vehicle 10 in response to vehicle 10 increasing in speed (e.g., to account for a larger required stopping distance associated with the higher speed of vehicle 10, etc.). In various embodiments, the perception zone is a dynamic perception zone. In some embodiments, step 730 includes generating a number of perception zones. For example, step 730 may include independently controlling the boundaries and/or weighting (e.g., how much vehicle 10 reacts to an obstacle located in a certain portion of a dynamic perception zone, etc.) of individual sub-zones associated with a dynamic perception zone.

At step 740, vehicle control system 110 controls an operation of the off-road vehicle based on the perception zone. In some embodiments, vehicle control system 110 performs a path planning operation based on the perception zone. For example, vehicle control system 110 may perform an A* algorithm to minimize an energy parameter associated with a proximity of vehicle 10 to one or more obstacles located within the perception zone and determine a path having a minimized distance to a destination. In various embodiments, step 740 includes generating control signals to operate primary mover 130. Additionally or alternatively, vehicle control system 110 may send control information to other systems. For example, vehicle control system 110 may send a graphical display of the perception zone to HMI 120 for display to a user.

As utilized herein with respect to numerical ranges, the terms "approximately," "about," "substantially," and similar terms generally mean +/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

The term "client or "server" include all kinds of apparatus, devices, and machines for processing data, including by way of example a programmable processor, a computer, a system on a chip, or multiple ones, or combinations, of the foregoing. The apparatus may include special purpose logic circuitry, e.g., a field programmable gate array (FPGA) or an application specific integrated circuit (ASIC). The apparatus may also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment may realize various different computing model infrastructures, such as web services, distributed computing and grid computing infrastructures.

The systems and methods of the present disclosure may be completed by any computer program. A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry (e.g., an FPGA or an ASIC).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data (e.g., magnetic, magneto-optical disks, or optical disks). However, a computer need not have such devices. Moreover, a computer may be embedded in another device (e.g., a vehicle, a Global Positioning System (GPS) receiver, etc.). Devices suitable for storing computer program instructions and data include all forms of non-volatile memory, media and memory devices, including by way of example semiconductor memory devices (e.g., EPROM, EEPROM, and flash memory devices; magnetic disks, e.g., internal hard disks or removable disks; magneto-optical disks; and CD ROM and DVD-ROM disks). The processor and the memory may be supplemented by, or incorporated in, special purpose logic circuitry.

To provide for interaction with a user, implementations of the subject matter described in this specification may be implemented on a computer having a display device (e.g., a CRT (cathode ray tube), LCD (liquid crystal display), OLED (organic light emitting diode), TFT (thin-film transistor), or other flexible configuration, or any other monitor for displaying information to the user. Other kinds of devices may be used to provide for interaction with a user as well; for example, feedback provided to the user may be any form of sensory feedback (e.g., visual feedback, auditory feedback, or tactile feedback).

Implementations of the subject matter described in this disclosure may be implemented in a computing system that includes a back-end component (e.g., as a data server), or that includes a middleware component (e.g., an application server), or that includes a front end component (e.g., a client computer) having a graphical user interface or a web browser through which a user may interact with an implementation of the subject matter described in this disclosure, or any combination of one or more such back end, middleware, or front end components. The components of the system may be interconnected by any form or medium of digital data communication (e.g., a communication network). Examples of communication networks include a LAN and a WAN, an inter-network (e.g., the Internet), and peer-to-peer networks (e.g., ad hoc peer-to-peer networks).

It is important to note that the construction and arrangement of the vehicle 10 and the systems and components thereof (e.g., the driveline 50, the braking system 100, the control system 200, etc.) as shown in the various exemplary embodiments is illustrative only. Additionally, any element disclosed in one embodiment may be incorporated or utilized with any other embodiment disclosed herein.

What is claimed is:

1. A vehicle control system for an off-road vehicle, the system comprising:
a processing circuit including a processor and memory, the memory having instructions stored thereon that, when executed by the processor, cause the processing circuit to:
receive a first parameter associated with a characteristic of the off-road vehicle;
receive a second parameter associated with a characteristic of an environment of the off-road vehicle;
generate, based on the first and second parameters, a perception zone for the off-road vehicle;
control the off-road vehicle to avoid an obstacle using the perception zone;
receive an indication of a change in at least one of the first parameter or the second parameter; and
update the perception zone based on the change in the at least one of the first parameter or the second parameter, an indication of an accuracy of a sensor associated with the off-road vehicle, and a confidence level associated with one or more components of the off-road vehicle, wherein the confidence level is based on lifetime parameters of the one or more components.

2. The vehicle control system of claim 1, wherein the first parameter is associated with a mass of the off-road vehicle.

3. The vehicle control system of claim 1, wherein the first parameter is associated with a component health of a component in the off-road vehicle.

4. The vehicle control system of claim 1, wherein the second parameter is associated with a characteristic of ground the off-road vehicle is operating on.

5. The vehicle control system of claim 4, wherein the second parameter includes a cornering stiffness.

6. The vehicle control system of claim 1, wherein the second parameter is associated with at least one of a weather condition or an ambient visibility.

7. The vehicle control system of claim 1, wherein the first parameter is associated with an implement operated by the off-road vehicle.

8. The vehicle control system of claim 1, wherein the perception zone is generated based on historical information.

9. The vehicle control system of claim 1, wherein the off-road vehicle is an agricultural vehicle.

10. The vehicle control system of claim 1, wherein the off-road vehicle is a construction vehicle.

11. The vehicle control system of claim 1, wherein controlling the off-road vehicle to avoid the obstacle using the perception zone includes at least one of causing the off-road vehicle to change in speed or causing the off-road vehicle to change in direction.

12. The vehicle control system of claim 11, wherein controlling the off-road vehicle to avoid the obstacle using the perception zone is performed autonomously without user input.

13. A method of obstacle avoidance for an off-road vehicle, comprising:
receiving a first parameter associated with a characteristic of the off-road vehicle;
receiving a second parameter associated with a characteristic of an environment of the off-road vehicle;
generating, based on the first and second parameters, a perception zone for the off-road vehicle;
controlling the off-road vehicle to avoid an obstacle using the perception zone;
receiving an indication of a change in at least one of the first parameter or the second parameter; and
updating the perception zone based on the change in the at least one of the first parameter or the second parameter and an indication of an accuracy of a sensor associated with the off-road vehicle, and a confidence level associated with one or more components of the off-road vehicle, wherein the confidence level is based on lifetime parameters of the one or more components.

14. The method of claim 13, wherein the first parameter is associated with a mass of the off-road vehicle.

15. The method of claim 13, wherein the first parameter is associated with at least one of a component health of a component in the off-road vehicle or an implement operated by the off-road vehicle.

16. The method of claim 13, wherein the second parameter is associated with a characteristic of ground the off-road vehicle is operating on.

17. The method of claim 13, wherein the off-road vehicle is an agricultural vehicle.

18. The method of claim 13, wherein the off-road vehicle is a construction vehicle.

19. The method of claim 13, wherein controlling the off-road vehicle to avoid the obstacle using the perception zone is performed autonomously without user input and includes at least one of causing the off-road vehicle to change in speed or causing the off-road vehicle to change in direction.

20. A non-transitory computer-readable storage medium having instructions stored thereon that, when executed by a processor, cause the processor to:
receive a first parameter associated with a characteristic of an off-road vehicle;
receive a second parameter associated with a characteristic of an environment of the off-road vehicle;
generate, based on the first and second parameters, a perception zone for the off-road vehicle;
control the off-road vehicle to avoid an obstacle using the perception zone;
receive an indication of a change in at least one of the first parameter or the second parameter; and
update the perception zone based on the change in the at least one of the first parameter or the second parameter, an indication of an accuracy of a sensor associated with the off-road vehicle, and a confidence level associated with one or more components of the off-road vehicle, wherein the confidence level is based on lifetime parameters of the one or more components.

* * * * *